(12) United States Patent
Sugai

(10) Patent No.: US 9,919,514 B2
(45) Date of Patent: Mar. 20, 2018

(54) LIQUID DISCHARGE APPARATUS AND LIQUID DISCHARGE METHOD THROUGH OBLIQUE IRRADIATION OF LIQUID DROPS, AND CHANGING OF FLYING DIRECTION OF THE LIQUID DROPLETS

(71) Applicant: SEIKO EPSON CORPORATION, Tokyo (JP)

(72) Inventor: Keigo Sugai, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/389,177

(22) Filed: Dec. 22, 2016

(65) Prior Publication Data

US 2017/0182763 A1  Jun. 29, 2017

(30) Foreign Application Priority Data

Dec. 28, 2015 (JP) .................................. 2015-255789

(51) Int. Cl.
*B41J 2/03* (2006.01)
*B33Y 30/00* (2015.01)
*B29C 64/209* (2017.01)

(52) U.S. Cl.
CPC ............... *B41J 2/03* (2013.01); *B29C 64/209* (2017.08); *B33Y 30/00* (2014.12); *B41J 2002/033* (2013.01)

(58) Field of Classification Search
CPC ....... B41J 2/03; B41J 2/075; B41J 2/09; B41J 2/105; B41J 2/02; B41J 2002/031; B41J 2002/032; B41J 211/02; B33Y 30/00; B29C 64/207
See application file for complete search history.

(56) References Cited

U.S. PATENT DOCUMENTS

| 3,878,519 | A | * | 4/1975 | Eaton | B41J 2/02 239/13 |
| 7,374,273 | B2 | | 5/2008 | Miura | |
| 2004/0226929 | A1 | * | 11/2004 | Miura | B41M 3/006 219/121.85 |
| 2005/0196614 | A1 | * | 9/2005 | Weber | B05D 1/02 428/411.1 |
| 2009/0096826 | A1 | * | 4/2009 | Hayashi | B41J 2/125 347/14 |
| 2013/0342597 | A1 | * | 12/2013 | Panchawagh | B41J 2/085 347/10 |

FOREIGN PATENT DOCUMENTS

| JP | 58-116162 | 7/1983 |
| JP | 06-064161 | 3/1994 |
| JP | 2004-181448 | 7/2004 |

* cited by examiner

*Primary Examiner* — Juanita D Jackson
(74) *Attorney, Agent, or Firm* — Workman Nydegger

(57) ABSTRACT

A liquid discharge apparatus includes: a head unit that has a nozzle array in which a plurality of nozzles are arranged, that discharges a liquid from each of the plurality of nozzles, and that causes liquid columns to extend downwardly; a liquid droplet generating unit that irradiates at least the two liquid columns with a laser beam in a direction obliquely intersecting with the arrangement direction when viewed from the center of the nozzle array and that separates liquid droplets from the liquid column; and a direction changing unit that applies energy to the liquid droplets and changes flying directions of the liquid droplets.

15 Claims, 7 Drawing Sheets

LIQUID DISCHARGE APPARATUS AND LIQUID DISCHARGE METHOD THROUGH OBLIQUE IRRADIATION OF LIQUID DROPS, AND CHANGING OF FLYING DIRECTION OF THE LIQUID DROPLETS

BACKGROUND

1. Technical Field

The present invention relates to a liquid discharge apparatus and a liquid discharge method.

2. Related Art

As an aspect of a liquid discharge apparatus that discharges a liquid, an ink jet printer that discharges ink and produces printed matter, or a 3D printer that discharges a liquid material and forms a three-dimensional object is known. For example, an ink jet printer disclosed in JP-A-6-64161 causes a heat generating unit (laser) provided in a portion of the nozzle to change a viscosity of a liquid column of ink that is formed at a nozzle and to generate pulsation in the liquid column, thereby continually forming ink particles.

However, in technology disclosed in JP-A-6-64161, since the heat generating unit is provided in a portion of the nozzle from which ink is discharged, dried ink is likely to be attached and accumulated on an edge of the nozzle and thus the nozzle is likely to have a low ink discharge performance. In an ink jet printer in the related art, there has been a demand for technology in which it is possible to reduce accumulation of ink in the vicinity of a nozzle such that it is possible to stably discharge ink. In addition, in the inkjet printer, there has been a demand for technology in which it is possible to more effectively discharge ink. The technology described above is objects that are common not only to an ink jet printer that is used for producing printed matter but also to various types of liquid discharge apparatuses having a mechanism capable of discharging a liquid. In particular, in a 3D printer that discharges a liquid material and produces a three-dimensional object, there has been a high demand for improved discharge technology of a liquid material because a liquid material having a relatively high viscosity is also used in some cases.

SUMMARY

An advantage of some aspects of the invention is to solve at least a part of the problems described above, and the invention can be implemented as the following forms.

[1] According to an aspect of the invention, a liquid discharge apparatus is provided. The liquid discharge apparatus may include a head unit, a liquid droplet generating unit, and a direction changing unit. The head unit may have a nozzle array in which a plurality of nozzles are arranged in a predetermined arrangement direction, may discharge a liquid from each of the plurality of nozzles, and may cause liquid columns to extend downwardly. The liquid droplet generating unit may irradiate at least the two liquid columns with a laser beam in a direction obliquely intersecting with the arrangement direction when viewed from the center of the nozzle array and may separate liquid droplets from the liquid column. The direction changing unit may apply energy to the liquid droplets and may change a flying direction of the liquid droplets. In the liquid discharge apparatus according to the aspect, since the liquid columns extending downwardly from the nozzles are irradiated with the laser beam from the position separated from the nozzles, the liquid is less dried and accumulated in the vicinity of discharge openings of the nozzles and thus degradation in a discharge performance of the liquid is reduced. In addition, since the irradiation is performed with the laser beam in the direction obliquely intersecting with the arrangement direction of the nozzles, it is possible to reduce light energy that is not applied to the liquid columns but passes away between the liquid columns, compared to a case where the irradiation is performed with a laser beam in a direction orthogonal to the arrangement direction of the nozzles. In addition, since it is possible to reduce a range of the irradiation with the laser beam, it is possible to efficiently increase a density of energy that is applied to the liquid columns from the laser beam or to decrease the liquid droplet generating unit in size.

[2] In the liquid discharge apparatus according to the aspect described above, the laser beam may have a condensed shape of which a horizontal width in a horizontal direction is wider than a vertical width in a vertical direction and the irradiation may be performed over at least the two liquid columns. The liquid discharge apparatus according to the aspect is efficiently used because it is possible to generate liquid droplets at the same time from the plurality of liquid columns through the irradiation with the laser beam which is performed once.

[3] In the liquid discharge apparatus according to the aspect described above, when the number of nozzles included in the nozzle array is N, an interval between the adjacent nozzles in the arrangement direction is D, the horizontal width of the laser beam is Lw, and a small angle of angles between a direction orthogonal to the arrangement direction and an emitting direction of the laser beam is θ, a relationship of Lw>D·(N−1)·cos θ may be satisfied. The liquid discharge apparatus according to the aspect is efficiently used because it is possible to apply light energy through the irradiation with the laser beam at a time to the liquid columns extending downwardly from all of the nozzles which configure the nozzle array.

[4] In the liquid discharge apparatus according to the aspect described above, the liquid droplet generating unit may perform scanning with the laser beam in a direction parallel to the arrangement direction, and may irradiate at least the two liquid columns with the laser beam. In the liquid discharge apparatus according to the aspect, it is possible to efficiently apply, to the plurality of liquid columns, light energy for generating liquid droplets, through the scanning with the laser beam.

[5] In the liquid discharge apparatus according to the aspect described above, the head unit may have a liquid chamber that communicates with each of the plurality of nozzles and that stores a liquid. In the liquid discharge apparatus according to the aspect, it is efficient to supply the liquid to the plurality of nozzles.

[6] In the liquid discharge apparatus according to the aspect described above, the direction changing unit may apply the energy to the liquid droplets through irradiation with the laser beam. In the liquid discharge apparatus according to the aspect, high controllability of the flying direction of the liquid droplets is achieved.

[7] In the liquid discharge apparatus according to the aspect described above, the liquid droplet generating unit may generate liquid droplets having a first size and liquid droplets having a second size that is larger than the first size. In the liquid discharge apparatus according to the aspect, since it is possible to discharge liquid droplets having a size that is suitable for an application, it is easy to produce printed matter or a three-dimensional object.

[8] The liquid discharge apparatus according to the aspect described above may further include a collecting unit that collects the liquid droplets having the first size or the liquid droplets having the second size and resupplies the collected liquid to the head unit. In the liquid discharge apparatus according to the aspect, since it is possible to collect and to reuse the liquid droplets, it is possible to efficiently use the liquid.

[9] In the liquid discharge apparatus according to the aspect described above, the direction changing unit may change a flying direction of the liquid droplets having the first size, but may not change a flying direction of the liquid droplets having the second size, and the collecting unit may collect the liquid droplets having the first size, of which the flying direction is changed, but may not collect the liquid droplets having the second size, of which the flying direction is not changed. In the liquid discharge apparatus according to the aspect, since the flying direction of the liquid droplets having the relatively small first size is changed and the liquid droplets are collected, it is possible to more efficiently collect the liquid droplets, compared to a case where the flying direction of the liquid droplets having the second size is changed and the liquid droplets are collected.

[10] In the liquid discharge apparatus according to the aspect described above, the direction changing unit may change a flying direction of the liquid droplets having the first size, but may not change a flying direction of the liquid droplets having the second size, and the collecting unit may not collect the liquid droplets having the first size, of which the flying direction is changed, but may collect the liquid droplets having the second size, of which the flying direction is not changed. In the liquid discharge apparatus according to the aspect, since it is possible to perform printing or forming of a three-dimensional object by controlling the flying direction of the liquid droplets having the relatively small first size, it is possible to form an image or a three-dimensional object with high accuracy.

[11] The liquid discharge apparatus according to the aspect described above may further include an energy applying unit that applies energy to the liquid droplets having landed on a predetermined target object. In the liquid discharge apparatus according to the aspect, for example, it is possible to perform a processing treatment in which liquid droplets having landed, is fixed to a target object, or the like.

[12] In the liquid discharge apparatus according to the aspect described above, the liquid may be a flowable composition that contains powder and a solvent, and the energy applying unit may apply energy to the liquid droplets having landed, thereby sintering the powder in the liquid droplets, or melting the powder in the liquid droplets and then solidifying the powder. In the liquid discharge apparatus according to the aspect, the powder in the liquid is sintered or solidified, thereby making it possible to fix, to a target object, the liquid droplets having landed.

The plurality of components included in the aspects of the invention described above are not all required and, in order to achieve some or all of the objects described above, or in order to achieve some or all of the effects described in the specification, it is possible to appropriately perform modification, removal, or replacement with another new component, on some of the plurality of components, or to partially remove specific details. In addition, in order to achieve some or all of the objects described above, or in order to achieve some or all of the effects described in the specification, it is possible to combine some or all of technical features included in an aspect of the invention described above and some or all of technical features included in another aspect of the invention described above such that another aspect of the invention is established.

The invention can be implemented as various aspects in addition to the liquid discharge apparatus. For example, the invention can be implemented as a method for discharging a liquid. Additionally, the invention can be implemented as an aspect of a three-dimensional-object forming apparatus, a three-dimensional-object forming method, an image forming apparatus, an image forming method, a printing apparatus, a printing method, a control method for each apparatus described above, a computer program that implements each of the methods and control methods described above, a non-transitory computer readable medium storing the computer program, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
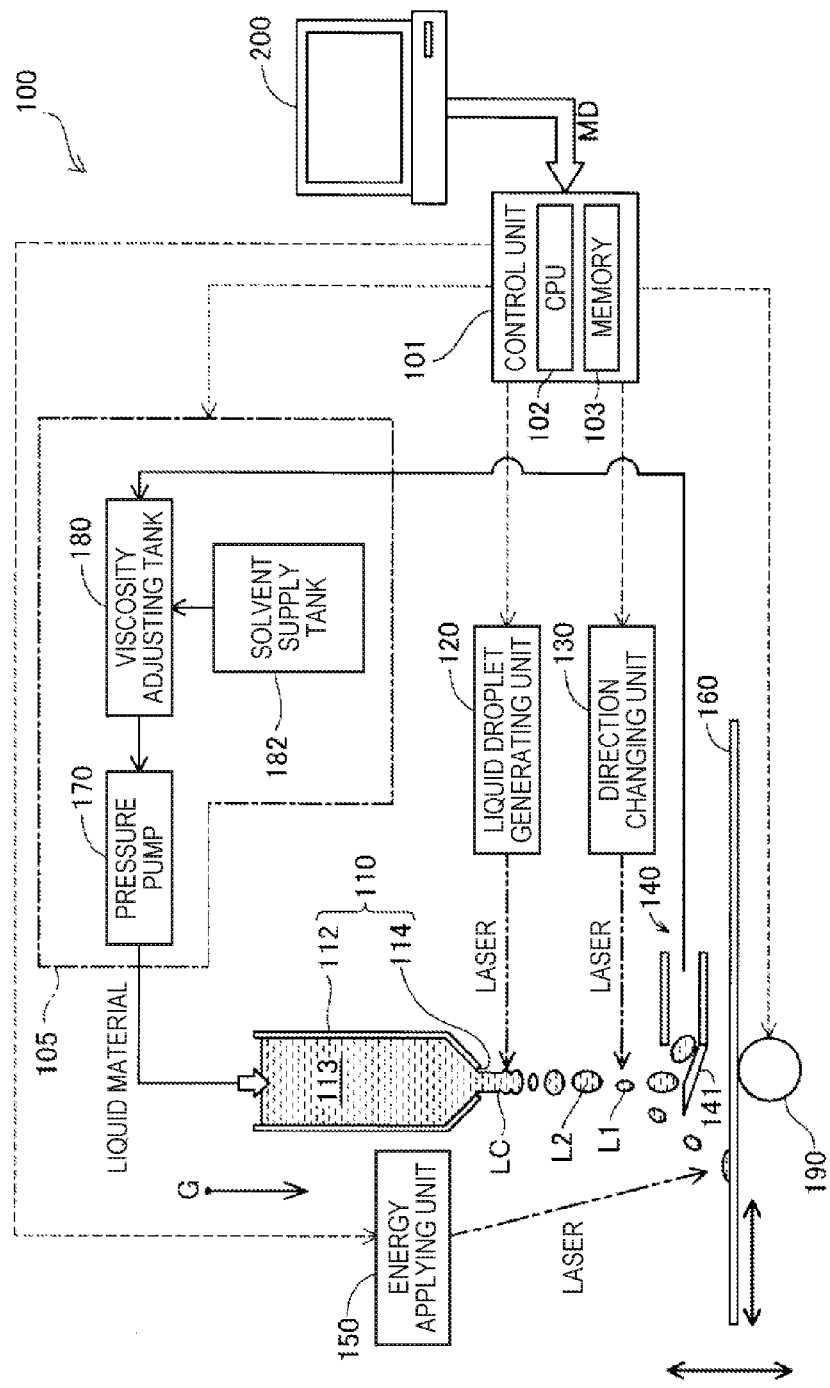
FIG. 1 is a diagram depicting a schematic configuration of a liquid discharge apparatus of a first embodiment.

FIG. 1 is a diagram depicting a schematic configuration of a liquid discharge apparatus 100 according to a first embodiment of the invention. In FIG. 1, arrow G represents the direction of gravitational force (vertical direction) when the liquid discharge apparatus 100 is disposed in a normal service state. Arrow G representing the vertical direction is appropriately shown in the drawings to which the following description is referred.

The liquid discharge apparatus 100 of the embodiment is a so-called 3D printer, discharges a liquid material from the head unit 110 toward a forming stage 160, stacks layers formed of a corresponding solidified primary material on the forming stage 160, and produces a three-dimensional object. The liquid discharge apparatus 100 includes a control unit 101, a liquid supply unit 105, a liquid droplet generating unit 120, a direction changing unit 130, a collecting unit 140, an energy applying unit 150, and a moving mechanism 190, in addition to the head unit 110 and the forming stage 160.

The control unit 101 controls the entirety of the liquid discharge apparatus 100. The control unit 101 is configured of a microcomputer that includes at least a CPU 102 and a memory 103. The CPU 102 reads and executes a program in the memory 103, thereby controlling entire operations of the liquid discharge apparatus 100. The program may be recorded in various types of recording medium.

A computer 200 is connected to the control unit 101. The control unit 101 receives, from the computer 200, data MD for forming a three-dimensional object. The data MD contains data indicating a discharge position of the liquid material on the layers stacked in a height direction of the three-dimensional object. The control unit 101 may directly acquire data via a network, a recording medium, or the like, without the computer 200. The following description is provided about control flow of the liquid discharge apparatus 100 by the control unit 101 performed when a three-dimensional object is formed.

The head unit 110 includes a liquid storing portion 112 and a nozzle 114. The liquid storing portion 112 is configured of a hollow container that is capable of storing a liquid material, and that stores a liquid material in an inner liquid chamber 113. In the embodiment, the liquid storing portion 112 is made of stainless steel. The liquid material used in the liquid discharge apparatus 100 of the embodiment is described below.

The liquid material stored in the liquid storing portion 112 is discharged outside through the nozzle 114. In the embodiment, the nozzle 114 communicates with a lower end of an inner space of the liquid storing portion 112 and is provided as a communication hole that opens toward a region positioned vertically below the head unit 110. The opening of the nozzle 114 may have a diameter of, for example, about 5 to 100 μm. Immediately after the liquid material is discharged from the nozzle 114, the liquid material extends downwardly from the nozzle 114 and forms a liquid column LC. In the embodiment, the liquid column LC is formed to have a diameter of about 10 to 100 μm. In FIG. 1, only one nozzle 114 is illustrated for the convenience sake. However, in the embodiment, a plurality of nozzles 114 arranged in a row are provided to the liquid storing portion 112. A configuration of the head unit 110 will be described in detail below.

The liquid supply unit 105 supplies the liquid material to the liquid storing portion 112 of the head unit 110 and applies pressure to the liquid material such that the liquid material is discharged from the nozzle 114. The liquid supply unit 105 includes a pressure pump 170, a viscosity adjusting tank 180, and a solvent supply tank 182.

The liquid material is stored in the viscosity adjusting tank 180, and a solvent component of the liquid material is stored in the solvent supply tank 182. A solvent is supplied to the viscosity adjusting tank 180 from the solvent supply tank 182. In addition, as will be described below, a liquid material collected by the collecting unit 140 is supplied to the viscosity adjusting tank 180. The viscosity adjusting tank 180 mixes the liquid material stored therein with the solvent supplied from the solvent supply tank 182 and adjusts a viscosity of the liquid material. The control unit 101 controls an amount of the solvent supplied from the solvent supply tank 182 such that the liquid material has a predetermined viscosity. In the embodiment, in the viscosity adjusting tank 180, the viscosity of the liquid material is adjusted to be 50 mPa·s or higher.

The liquid material in the viscosity adjusting tank 180 is supplied to the liquid storing portion 112 of the head unit 110 due to driving of the pressure pump 170. Pressure is applied by the pressure pump 170, and thereby the liquid material is discharged from the nozzle 114 of the head unit 110. The control unit 101 monitors, with a manometer (not illustrated), the pressure of the liquid material in the head unit 110 and performs feedback control of the pressure that is applied to the liquid material by the pressure pump 170. In this manner, a flow rate of the liquid material is adjusted such that the liquid material extends downwardly from the nozzle 114 and has a liquid column shape. It is desirable that the flow rate of the liquid material is determined in consideration of the viscosity of the liquid material. In the embodiment, the control unit 101 adjusts the pressure of the liquid material such that the flow rate of the liquid material that is discharged from the nozzle 114 is 10 m/sec to 20 m/sec.

The liquid droplet generating unit 120 applies energy to the liquid columns LC of the liquid material extending downwardly from the plurality of nozzles 114 of the head unit 110, respectively, from a position separated from the head unit 110, thereby generating liquid droplets of the liquid material from the corresponding liquid column LC. In the embodiment, the liquid droplet generating unit 120 is configured of a laser device, irradiates, with a laser beam, the liquid column LC of the liquid material, and applies light energy to the liquid column. The liquid droplet generating unit 120 includes at least a laser beam source and a condenser for condensing, on the liquid material having the liquid column shape, a laser beam emitted from the laser beam source. An internal configuration of the liquid droplet generating unit 120 is not illustrated.

The liquid droplet generating unit 120 of the embodiment irradiates the liquid column LC extending downwardly from the nozzle 114, with a pulsed laser beam having cyclically changing energy. When the liquid is irradiated with such a laser beam, a portion having a high temperature and a portion having a low temperature are formed in the liquid column LC in a direction in which the liquid material flows (in a direction in which the liquid column LC extends downwardly). A temperature gradient generated in the liquid column LC causes a portion of the liquid column LC to have a small and reduced diameter, causes the liquid column LC to be torn at the portion, and causes liquid droplets to be generated. The generated liquid droplets drop in the vertical direction due to action of gravity. In this manner, in the configuration in which light energy is applied to the liquid column LC of the liquid material from the laser beam, it is possible to form a sufficient temperature gradient for forming liquid droplets, in the liquid column LC, even in a case of using a liquid material having a high viscosity suitable for forming a three-dimensional object.

Here, a size of liquid droplets that are separated and fly from the liquid column LC is determined depending on characteristics of the liquid material, a timing of irradiation with the laser beam by the liquid droplet generating unit 120, and an amount of energy (a wavelength or intensity of the laser beam) that is applied to the liquid column LC from the laser beam. In the embodiment, the control unit 101 controls the timing of irradiation with the laser beam by the liquid droplet generating unit 120, thereby generating first liquid droplets L1 having a first size and second liquid droplets L2 having a second size that is larger than the first liquid droplets L1 having the first size. In the specification, a size of a liquid droplet means a volume of a liquid droplet. Here, the size of the liquid droplet may be construed as a weight of the liquid droplet. In the embodiment, the liquid column LC is irradiated with the laser beams at different irradiation intervals and thereby it is possible to adjust the size of the liquid droplets. For example, when the irradiation with the laser beams is performed at short intervals, it is possible to generate liquid droplets having a small size to the extent of the short intervals. When the irradiation with the laser beams is performed at long intervals, it is possible to generate liquid droplets having a large size to the extent of the long intervals. In the embodiment, when the first liquid droplets L1 are generated, the control unit 101 more decreases the intervals of the irradiation with the laser beams, compared to a case where the second liquid droplets L2 are generated. Note that the control unit 101 may control time of irradiation, an output of irradiation, a wavelength, a range of irradiation with the laser beam, thereby generating liquid droplets having different sizes from each other.

In the embodiment, the liquid droplet generating unit 120 irradiates, with the laser beam, the liquid column LC of the liquid material at a position separated from the nozzle 114 by a predetermined distance. A distance between the nozzle 114 and the irradiation position with the laser beam may be, for example, about 0.3 to 0.7 mm. In the embodiment, the liquid column LC of the liquid material is irradiated with the laser beam at a position vertically below the nozzle 114, which is separated from the nozzle by 0.5 mm. In addition, in the embodiment, the liquid droplet generating unit 120 performs the irradiation with the laser beam toward the liquid column LC extending downwardly downward from the nozzle 114, in a direction that obliquely intersects with an arrangement direction of the nozzles 114 in the head unit 110. The laser beam emitted from the liquid droplet generating unit 120 has a width with which it is possible to irradiate the plurality of liquid columns LC extending downwardly from the nozzles 114, at a time. An emitting direction of a laser beam from the liquid droplet generating unit 120 and a shape of the laser beam will be described in detail below. Note that, in the specification, the emitting direction of the laser beam means a direction parallel to an optical axis of the laser beam.

The direction changing unit 130 is provided below the liquid droplet generating unit 120. The direction changing unit 130 applies energy to at least some of the liquid droplets that are generated by the liquid droplet generating unit 120 and flies in the vertical direction, thereby changing the flying direction thereof. In the embodiment, the direction changing unit 130 is configured of a laser device and applies light energy to the first liquid droplets L1 having the first size. The direction changing unit 130 includes at least a laser beam source and a condenser for condensing, on the liquid droplets, a laser beam emitted from the laser beam source. An internal configuration of the direction changing unit 130 is not illustrated.

In the embodiment, the direction changing unit 130 is capable of performing parallel irradiation with a plurality of laser beams and, thus, one laser beam is emitted to one nozzle 114. The direction changing unit 130 emits a laser beam from a direction perpendicular to the flying direction of the liquid droplets. In addition, in the embodiment, the direction changing unit 130 performs the irradiation with the laser beam from the direction perpendicular to the arrangement direction of the nozzles 114 in the head unit 110. In other words, in the embodiment, an emitting direction of the laser beam from the direction changing unit 130 is different from the emitting direction of the laser beam from the liquid droplet generating unit 120, and intersects with the emitting direction of the laser beam from the liquid droplet generating unit 120. The position at which the liquid droplet generating unit 120 irradiates the flying liquid droplets with the laser beam may be, for example, a position vertically below the head unit 110, which is separated from the head unit 110 by 0.8 mm to 1.2 mm. In the embodiment, a distance between the head unit 110 and the irradiation position with the laser beam by the direction changing unit 130 may be, for example, about 1 mm.

When the flying liquid droplets are irradiated with the laser beam, at least a part of a solvent in the liquid droplets is instantaneously gasified, then gas is produced, and the flying direction of the liquid droplets is changed due to pressure of the gas. More specifically, the flying direction of the liquid droplets is bent to the emitting direction of the laser beam by the direction changing unit 130. The higher the energy of the irradiation with the laser beam and the smaller the size of the liquid droplets, the more a degree of a change in the flying direction of the liquid droplets is increased. The irradiation with the laser beam by the direction changing unit 130 is performed at a timing at which the liquid droplets cross the direction changing unit 130. In the embodiment, the control unit 101 links the timing of the laser-beam irradiation by the direction changing unit 130 with a timing at which the first liquid droplets L1 are generated by the liquid droplet generating unit 120 and determines the timing of the laser-beam irradiation by the direction changing unit. The intensity or the wavelength of the laser beam emitted from the direction changing unit 130 may be determined in advance depending on the characteristics of the liquid material and the size of the first liquid droplets L1, or the intensity or the wavelength may be controlled by the control unit 101. In this manner, a laser beam can instantaneously apply energy for changing the flying direction to liquid droplets. In addition, in the embodiment, since the direction changing unit 130 is capable of performing irradiation with one laser beam with respect to one nozzle 114, it is possible to apply light energy to the liquid droplets selected from the liquid droplets discharged from the nozzles 114 and, thus, the high controllability of the flying direction of the liquid droplets is achieved.

Additionally, when the flying direction of the liquid droplets is changed through applying the light energy to the liquid droplets, it is possible to achieve the following effects. For example, in a case of employing a configuration in which the liquid droplets are charged and the flying direction is changed due to an electrostatic force, there is a need to use a liquid material that can be charged. By comparison, in the liquid discharge apparatus 100 of the embodiment, since the flying direction of the liquid droplets is changed by using the light energy, it is possible to use a liquid material that cannot be charged or is difficult to be charged. Hence, the liquid material that is used in producing of a three-dimensional object can be selected from a broad range of types of liquid materials.

The first liquid droplets L1, of which the flying direction is changed by the direction changing unit 130, land on the forming stage 160 that is disposed vertically below the head unit 110. The forming stage 160 may be made of a flat plate-shaped member that horizontally extends and may be disposed vertically below the head unit 110 at a position separated from the head unit by 1.5 to 3 mm. In the embodiment, a distance between the forming stage 160 and the head unit 110 is about 2 mm. In addition, in the embodiment, the forming stage 160 is relatively shifted, by the moving mechanism 190, in the horizontal direction and the vertical direction with respect to the head unit 110 and the energy applying unit 150. The moving mechanism 190 includes a motor, a roller, a shaft, various actuators or the like, for moving the forming stage 160. The movement of the forming stage 160 by the moving mechanism 190 is controlled by the control unit 101. Note that another embodiment may employ a configuration in which the position of the forming stage 160 is fixed and the head unit 110 and the energy applying unit 150 are shifted with respect to the forming stage 160.

The energy applying unit 150 applies energy to the liquid droplets that land on the forming stage 160 such that the liquid droplets harden. In the embodiment, the energy applying unit 150 is configured of a laser device, performs irradiation with a laser beam, and thereby applies light energy to the liquid droplets. The energy applying unit 150 includes at least a laser beam source, a condenser for condensing, on a liquid droplet having landed, a laser beam emitted from the laser beam source, and a galvano mirror for scanning with the laser beam (which are not illustrated). The energy applying unit 150 scans, with the laser beam, a landing position of the liquid droplets on the forming stage 160 and a powder material in the liquid droplets is sintered due to the light energy of the laser beam. Otherwise, the powder material in the liquid droplets is melted and then is solidified. In this manner, particles, which configure a three-dimensional object as a producing target and a support portion for supporting the three-dimensional object, are fixed on the forming stage 160.

In the embodiment, among the liquid droplets generated by the liquid droplet generating unit 120, the second liquid droplets L2, of which the flying direction is not changed by the direction changing unit 130, are collected by the collecting unit 140. The collecting unit 140 is also called a "gutter". The collecting unit 140 has a receptacle 141 for collecting the liquid droplets L2. The receptacle 141 is disposed below the nozzle 114 so as to receive the liquid droplets that fly in the vertical direction. The liquid droplets received in the receptacle 141 are gathered by a suction device (not illustrated) such as a suction pump and is sent to the viscosity adjusting tanks 180. In this manner, in the liquid discharge apparatus 100 of the embodiment, since the liquid droplets collected by the collecting unit 140 are reused, less liquid material is wasted.

Particularly in the embodiment, as described above, the flying direction of the first liquid droplets L1 having the small size is changed by the laser beam from the direction changing unit 130 and the liquid droplets L1 are caused to land on the forming stage 160. Hence, it is possible to form a three-dimensional object in a more accurate and fine manner. In addition, in the embodiment, since the second liquid droplets L2 having the large size are collected in the collecting unit 140, it is possible to enhance collection efficiency of the liquid material and to efficiently reuse the liquid material. In addition, in the embodiment, since the flying direction of the first liquid droplets L1 having the small size is changed by the direction changing unit 130, it is possible to more increase the change in the flying direction, compared to a case of changing the flying direction of the second liquid droplets L2 having the large size. Therefore, the liquid droplets that need to land on the forming stage 160 are less likely to be collected in the collecting unit 140 by accident.

The liquid material used in the liquid discharge apparatus 100 of the embodiment is a flowable composition that contains powder and a solvent. Examples of the liquid material may include a slurry or paste of mixed materials that contains a solvent, a binder, and, for example, powder of a single element of magnesium (Mg), iron (Fe), cobalt (Co), chromium (Cr), aluminum (Al), titanium (Ti), copper (Cu), or nickel (Ni), or mixed powder such as an alloy containing one or more types of metal described above (maraging steel, stainless steel, cobalt-chromium-molybdenum, a titanium alloy, a nickel alloy, an aluminum alloy, a cobalt alloy, or a cobalt-chromium alloy). In addition, other examples of components may include melting resins of general-purpose engineering plastics or the like, such as a polyamide, polyacetal, polycarbonate, modified polyphenylene ether, polybutylene terephthalate, or polyethylene terephthalate. Otherwise, still other examples of components may include resins of engineering plastics or the like such as a polysulfone, polyethersulfone, polyphenylene sulfide, polyarylate, polyimide, polyamide-imide, polyetherimide, or polyether ether ketone. As described above, there is no particular limitation on the liquid material and it is possible to use metal other than the metal described above, ceramics, resins or the like. Examples of the solvent of the liquid material may include, for example, water; (poly)alkylene glycol monoalkyl ethers such as ethylene glycol monomethyl ether, ethylene glycol monoethyl ether, propylene glycol monomethyl ether, or propylene glycol monoethyl ether; acetate esters such as ethyl acetate, n-propyl acetate, isopropyl acetate, n-butyl acetate, or isobutyl acetate; aromatic hydrocarbons such as benzene, toluene, or xylene; ketones such as methyl ethyl ketone, acetone, methyl isobutyl ketone, ethyl-n-butyl ketone, diisopropyl ketone, or acetylacetone; alcohols such as ethanol, propanol, or butanol; tetraalkylammonium acetates; a sulfoxide-based solvent medium such as dimethyl sulfoxide or diethyl sulfoxide; a pyridine-based solvent medium such as pyridine, γ-picoline, or 2,6-lutidine; an ionic liquid such as tetraalkylammonium acetate (for example, tetrabutylammonium acetate), or a combination of one or more types selected from the substances described above. In addition, examples of the binder may include, for example, acrylic resins, epoxy resins, silicone resins, cellulose-based resins, synthetic resins other than the resins described above, polylactic acid (PLA), a polyamide (PA), polyphenylene sulfide (PPS), or thermoplastic resins other than the substances described above.

Figure 2:
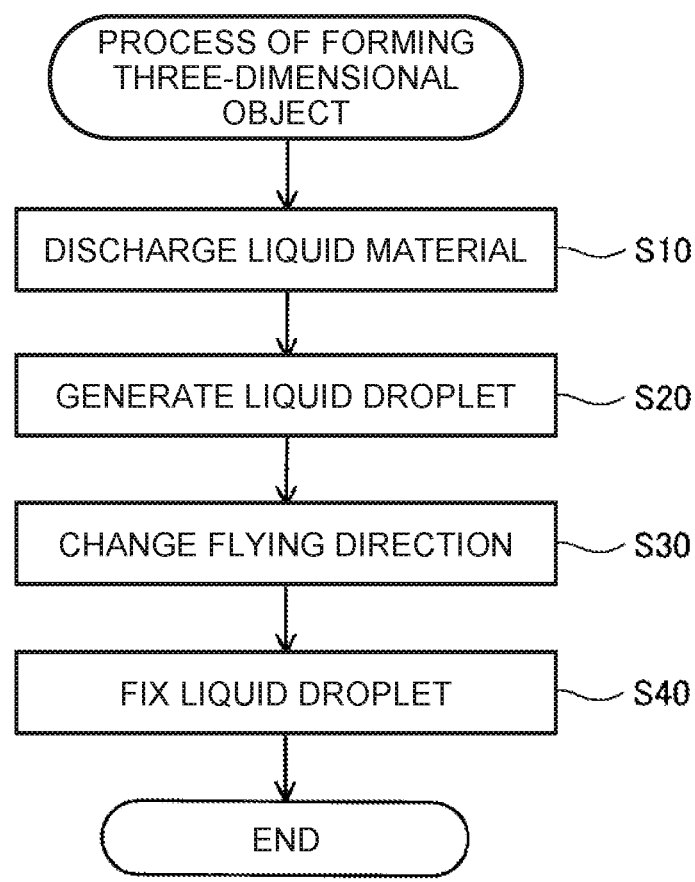
FIG. 2 is a flowchart illustrating a forming process of a three-dimensional object.

FIG. 2 is a flowchart illustrating a forming process of a three-dimensional object, which is performed by the liquid discharge apparatus 100 under the control by the control unit 101 when a three-dimensional object is formed. When the three-dimensional object is formed, the control unit 101 causes the liquid discharge apparatus 100 to repeatedly execute the following processes in accordance with a program. In step S10, the control unit 101 controls the pressure pump 170 such that the liquid is discharged to have a liquid column shape from the plurality of nozzles 114 included in the head unit 110. In step S20, the control unit 101 controls the liquid droplet generating unit 120 such that the liquid droplet generating unit irradiates, with the laser beam, the liquid columns LC extending downwardly from the plurality of nozzles 114, respectively, and then the liquid droplets are generated. Note that the control unit 101 determines, in advance, a timing at which the irradiation is performed with the laser beam, based on the data MD received from the computer 200.

In step S30, the control unit 101 controls the direction changing unit 130 such that the direction changing unit irradiates, with the laser beam, the first liquid droplets L1 of the generated liquid droplets and changes the flying direction of the liquid droplets. In addition, in step S30, the control unit 101 controls the moving mechanism 190 based on the data MD such that the moving mechanism causes the forming stage 160 to move. In this manner, the landing position of the liquid droplets having the changed flying direction on the forming stage 160 is adjusted. Note that, as described above, the second liquid droplets L2, of which the flying direction is not changed are collected in the collecting unit 140 and returns to the liquid supply unit 105.

In step S40, the control unit 101 controls the energy applying unit 150 such that the energy applying unit irradiates, with the laser beam, the liquid material that lands on the forming stage 160, solidifies the liquid material and fixes the liquid material to the landing position. The processes in steps S10 to S40 are repeatedly performed and solidified material particles are stacked, and thereby the three-dimensional object is formed on the forming stage 160.

Figure 3:
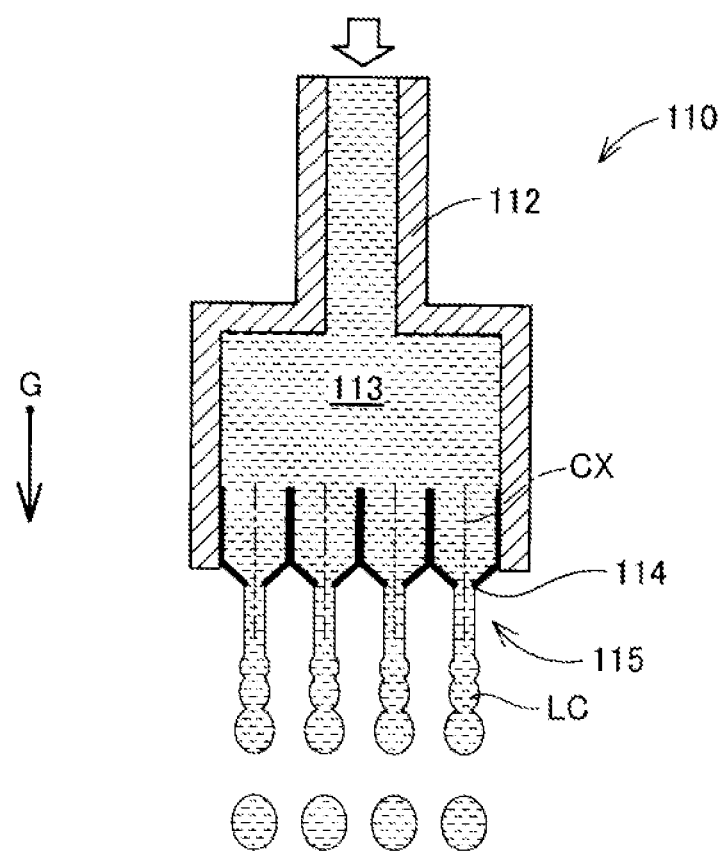
FIG. 3 is a sectional view schematically illustrating a configuration of a head unit.

FIG. 3 is a sectional view schematically illustrating a configuration of the head unit 110 viewed when the head unit is cut along a virtual plane including central axes CX of the plurality of nozzles 114 provided in the head unit 110. In the liquid discharge apparatus 100 of the embodiment, the head unit 110 has a nozzle array 115 in which the plurality of nozzles 114 are arranged in a row in a predetermined arrangement direction. FIG. 3 illustrates four nozzles 114, for the convenience sake. In the embodiment, the nozzles 114 of the nozzle array 115 are straightly aligned when viewed in the vertical direction. The nozzles 114 of the nozzle array 115 are arranged at substantially equal intervals. A distance between the central axes CX of the nozzles 114 may be, for example, 100 to 200 μm. A direction, in which the nozzle array 115 extends, corresponds to a subordinate concept of the predetermined arrangement direction according to the invention.

The nozzles 114 communicate with the liquid chamber 113 of the liquid storing portion 112. In other words, in the embodiment, the liquid chamber 113 is common to the nozzles 114. In this manner, the liquid material having substantially equal pressure is supplied to the nozzles 114 from the liquid storing portion 112, in a substantially uniform manner, and the liquid columns LC having substantially the same state are formed from the nozzles 114. As described above, the liquid discharge apparatus 100 of the embodiment is efficiently used because the control unit 101 controls the pressure pump 170 such that the plurality of liquid columns LC are efficiently formed at the same time from the plurality of nozzles 114. In addition, since the liquid material is discharged from the plurality of nozzles 114 at the same time, it is possible to form the three-dimensional object at a high speed.

Figure 4:
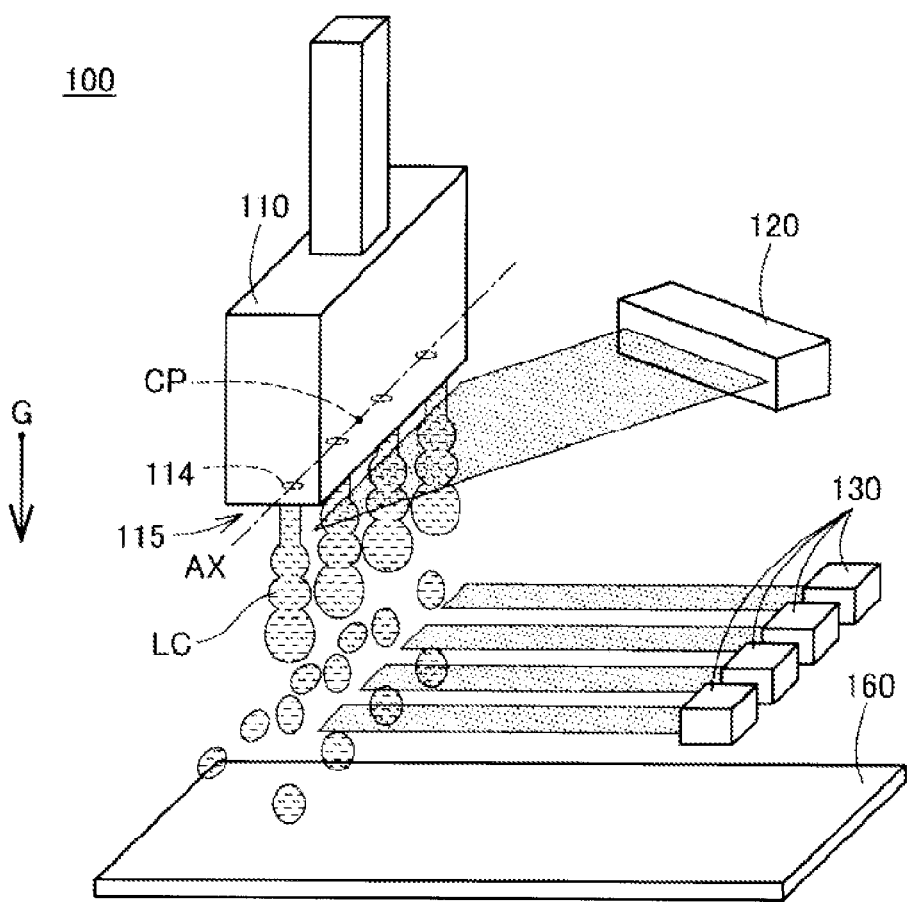
FIG. 4 is a perspective view schematically illustrating a positional relationship between the head unit, a liquid droplet generating unit, a direction changing unit, and a forming stage.

FIG. 4 is a perspective view schematically illustrating a positional relationship between the head unit 110, the liquid droplet generating unit 120, the direction changing unit 130, and the forming stage 160 in the liquid discharge apparatus 100. FIG. 4 schematically illustrates a state in which the liquid material is discharged from the nozzles 114 of the head unit 110 and both of the liquid droplet generating unit 120 and the direction changing unit 130 perform the irradiation the laser beams. In addition, FIG. 4 illustrates an axial line AX that represents the arrangement direction of the nozzle array 115 and the center CP of the nozzle array 115 in the arrangement direction.

In the liquid discharge apparatus 100 of the embodiment, the head unit 110, the liquid droplet generating unit 120, the direction changing unit 130, and the forming stage 160 are disposed in the vertical direction in this order. The liquid droplet generating unit 120 is positioned in a direction obliquely intersecting with the arrangement direction of the nozzles 114 when viewed from the center CP of the nozzle array 115, and emits the laser beam extending in a straight line shape from the position. The laser beam, with which the irradiation is performed by the liquid droplet generating unit 120, extends in a straight line shape, in a strip shape, or in a flat plate shape, toward a region below the head unit 110 from which the liquid columns LC of the liquid material are formed. The laser beam emitted from the liquid droplet generating unit 120 has a horizontal width which is wider than a vertical width, and the horizontal width is a width with which it is possible to irradiate the plurality of liquid columns LC extending downwardly from the nozzles 114, at a time. In the specification, the horizontal width of the laser beam means a diameter of the laser beam in the horizontal direction, and the vertical width of the laser beam means a diameter of the laser beam in the vertical direction. The liquid discharge apparatus 100 of the embodiment is efficiently used because the liquid droplets are generated from the plurality of liquid columns LC at the same time through the irradiation with the laser beam having a condensed shape in which the horizontal width is wide. Note that the condensed shape of the laser beam emitted from the liquid droplet generating unit 120 of the embodiment will be described in detail below.

The direction changing unit 130 is positioned in a direction orthogonal to the arrangement direction of the nozzles 114 when viewed from the head unit 110, and emits a plurality of laser beams parallel to each other, from the position in the direction orthogonal to the arrangement direction of the nozzles 114. The direction changing unit 130 performs the irradiation with the number of laser beams that corresponding to the number of the nozzles 114 in the head unit 110. Each of the laser beams emitted from the direction changing unit 130 is orthogonal to any one of the central axes CX of the nozzles 114 which extend in the vertical direction. It is desirable that a diameter of a spot of each laser beam which is emitted from the direction changing unit 130 is determined in advance depending on the characteristics of the liquid material and the size of the liquid droplets that are generated by the liquid droplet generating unit 120.

Figure 5:
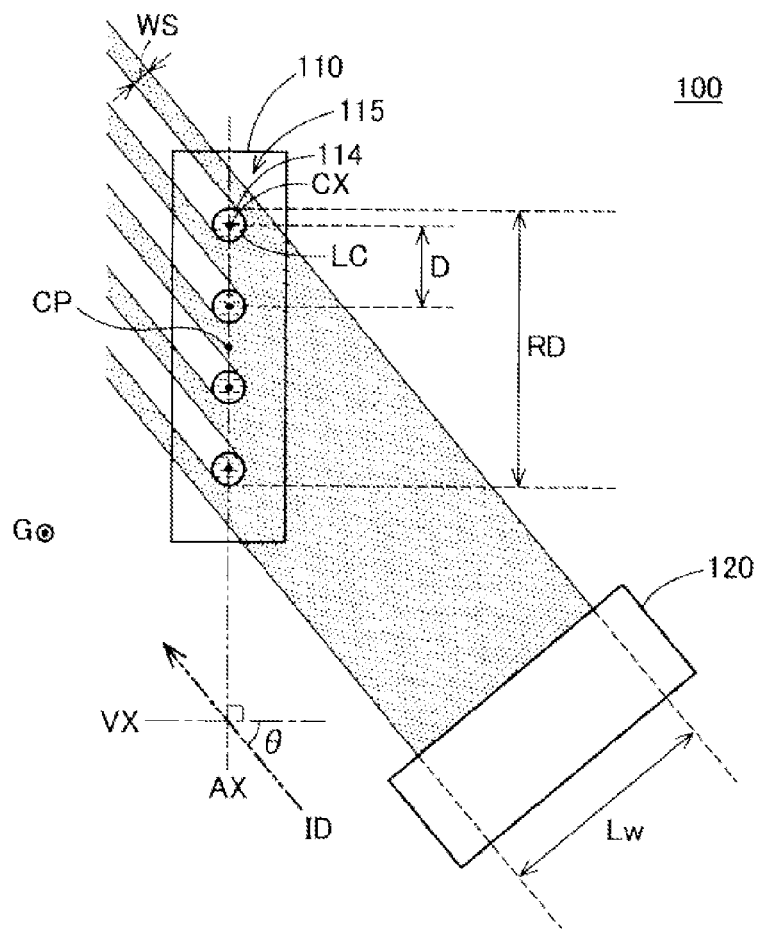
FIG. 5 is a diagram schematically depicting an emitting direction of a laser beam from the liquid droplet generating unit.

With reference to FIG. 5, an emitting direction of a laser beam from the liquid droplet generating unit 120 is described in detail. FIG. 5 schematically illustrates the head unit 110 and the liquid droplet generating unit 120 when the liquid discharge apparatus 100 is viewed from below in the vertical direction. FIG. 5 schematically illustrates a state in which the liquid columns LC generated from the nozzles 114 are irradiated with the laser beam emitted from the liquid droplet generating unit 120. In addition, similar to FIG. 4, FIG. 5 illustrates a position of the central axes CX of the nozzles 114, the axial line AX that represents the arrangement direction, and the center CP of the nozzle array 115.

As described above, in the liquid discharge apparatus 100 of the embodiment, the liquid droplet generating unit 120 emits the laser beam in the direction obliquely intersecting with the arrangement direction of the nozzles 114 when viewed from the center CP of the nozzle array 115. Therefore, the laser beam, which passes between the two adjacent liquid columns LC and diverges, has a narrower horizontal width WS, compared to a configuration in which the laser beam is emitted in the direction orthogonal to the arrangement direction of the nozzles 114 toward the head unit 110. Hence, an amount of light energy that passes between the adjacent liquid columns LC is reduced and less light energy is wasted.

Here, the number of nozzles 114 included in the nozzle array 115 is N (N is a natural number greater than or equal to 2) and the interval (hereinafter, also referred to as a "nozzle interval") between the adjacent nozzles 114 is D. The nozzle interval D is a distance between the central axes CX of the adjacent nozzles 114 in the arrangement direction of the nozzles 114. The horizontal width of the laser beam that is emitted from the liquid droplet generating unit 120 is Lw, and a small angle of angles between an emitting direction ID of the laser beam and an axial line VX orthogonal to the axial line AX that represents the arrangement direction of the nozzles 114 is θ.

Here, in the liquid discharge apparatus 100 of the embodiment, a relationship of the following inequality expression (A) is satisfied. When the laser beam that is emitted from the liquid droplet generating unit 120 has the horizontal width Lw that satisfies the relationship of the following inequality expression (A), it is possible to apply light energy to the liquid columns LC extending downwardly from all of the nozzles 114 which configure the nozzle array 115.

$$Lw > D \cdot (N-1) \cdot \cos \theta \qquad (A)$$

In addition, in the liquid discharge apparatus 100 of the embodiment, it is desirable that the horizontal width Lw of the laser beam that is emitted from the liquid droplet generating unit 120 is narrower than a width RD of the nozzle array 115 in the arrangement direction of the nozzles 114. In this manner, it is possible to reduce the liquid droplet generating unit 120 in size. In addition, the horizontal width Lw of the laser beam is narrowed, and thereby it is possible to increase a density of the light energy that is applied to the liquid columns LC and it is possible to improve efficiency of generating the liquid droplets.

Figure 6:
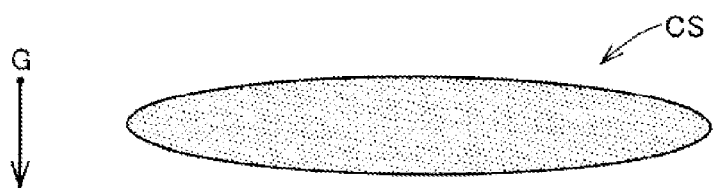
FIG. 6 is a diagram schematically illustrating an example of a condensed shape of the laser beam emitted from the liquid droplet generating unit.
Figure 7:
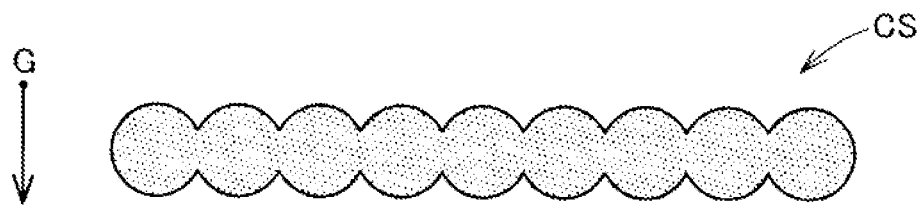
FIG. 7 is a diagram schematically illustrating another example of a condensed shape of the laser beam emitted from the liquid droplet generating unit.

With reference to FIG. 6 and FIG. 7, the condensed shape of the laser beam that is emitted from the liquid droplet generating unit 120 is described. FIG. 6 and FIG. 7 schematically illustrate examples of the condensed shape CS as shapes of the corresponding laser beams on a sectional plane perpendicular to the emitting direction of the laser beam that is emitted from the liquid droplet generating unit 120. The liquid droplet generating unit 120 may perform irradiation with the laser beam having the condensed shape of a substantially elliptical shape of which the horizontal width is wider than the vertical width such that the condensed shape of the laser beam is formed by a condenser as illustrated in FIG. 6. Otherwise, the liquid droplet generating unit 120 may be configured of a fiber-integrated laser device that performs irradiation in a state in which optical fibers are disposed in parallel to forma straight line shape and the parallel laser beams from the optical fibers overlap each other. In this case, the condensed shape of the laser beam is a shape in which a plurality of substantially circular shapes are continuous in the horizontal direction, as illustrated in FIG. 7. Note that the condensed shape of the laser beam emitted from the liquid droplet generating unit 120 is not limited to the shapes illustrated in FIGS. 6 and 7.

As described above, in the liquid discharge apparatus 100 of the embodiment, the liquid droplet generating unit 120 applies the energy for generating the liquid droplets to the liquid material at a position separated from the nozzles 114. Therefore, the liquid material or components therein are less dried and accumulated in the vicinity of each of the nozzles 114, and the discharge of the liquid material from the nozzle 114 is less inhibited, and thereby discharge performance of the liquid material is stabilized. In addition, as illustrated in the embodiment, when the configuration in which the energy for generating the liquid droplets is applied from the outside of the head unit 110, it is possible to omit a mechanism for generating the liquid droplets in the head unit 110. Hence, it is possible to simplify a structure of the head unit 110, it is possible to easily increase the pressure resistance of the head unit 110, and it is possible to use a liquid material having a higher viscosity.

In addition, in the liquid discharge apparatus 100 of the embodiment, the liquid droplet generating unit 120 emits the laser beam in the direction obliquely intersecting with the arrangement direction of the nozzles 114 when viewed from the center CP of the nozzle array 115. Therefore, as described above, the light energy is less likely to be wasted and the energy efficiency for generating the liquid droplets is increased. Additionally, in the liquid discharge apparatus 100 of the embodiment, it is possible to achieve various operational effects described in the embodiment.

B. Second Embodiment

Figure 8:
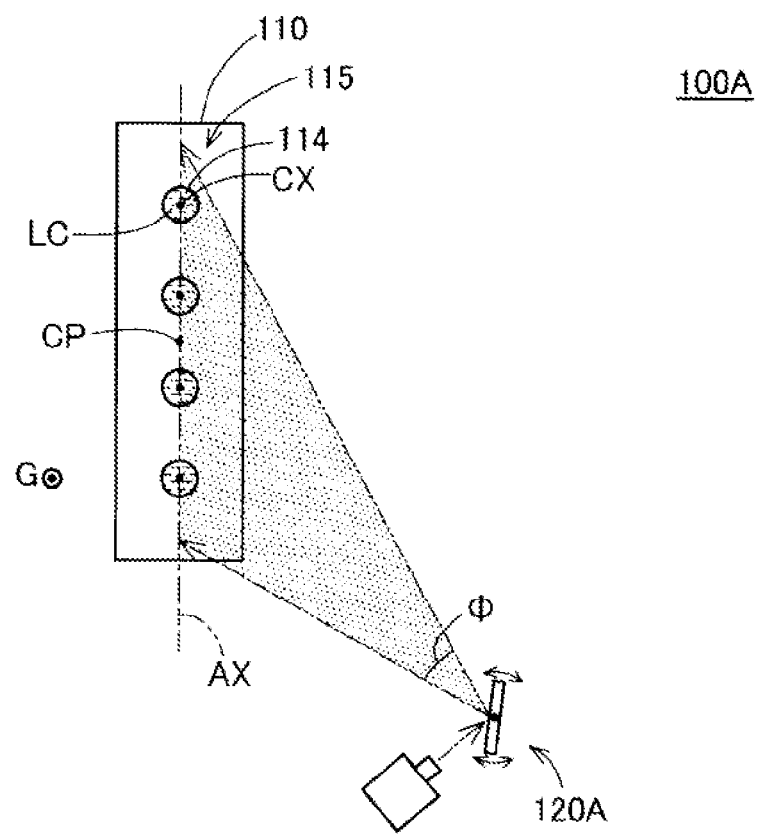
FIG. 8 is a diagram schematically depicting a configuration of a liquid discharge apparatus of a second embodiment.

FIG. 8 is a diagram schematically depicting a configuration of a liquid droplet generating unit 120A included in a liquid discharge apparatus 100A of the second embodiment. Similar to FIG. 5, FIG. 8 schematically illustrates the head unit 110 and the liquid droplet generating unit 120A, when the liquid discharge apparatus 100A of the second embodiment is viewed from below in the vertical direction. FIG. 8 schematically illustrates, as a hatched portion, a region that is scanned with the laser beam emitted from the liquid droplet generating unit 120.

The liquid discharge apparatus 100A of the second embodiment has substantially the same configuration as the liquid discharge apparatus 100 described in the first embodiment, except for a different configuration of the liquid droplet generating unit 120A. The liquid droplet generating unit 120A of the second embodiment is positioned in the direction obliquely intersecting with the arrangement direction of the nozzles 114 when viewed from the center CP of the nozzle array 115. Then, horizontal scanning with the laser beam emitted from one laser beam source is performed in the arrangement direction of the nozzles 114 from the position, by using a galvano mirror or a digital micromirror device, and the plurality of liquid columns LC extending downwardly from the plurality of nozzles 114 are continuously irradiated. In this manner, the light energy for generating the liquid droplets is continuously applied to the plurality of liquid columns LC. Note that a diameter of a spot of the laser beam that is emitted from the liquid droplet generating unit 120A may be larger than a diameter of the liquid column LC. However, in terms of irradiation efficiency of the laser beam, it is preferable that the diameter of the corresponding spot is smaller than or equal to the diameter of the liquid column LC.

In the liquid discharge apparatus 100A of the second embodiment, loss of light energy due to the laser beam that passes between the liquid columns LC is reduced, compared to a configuration in which the scanning with the laser beam is performed from a position in a direction orthogonal to the arrangement direction of the nozzles 114 when viewed from the center CP of the nozzle array 115. In addition, it is possible to decrease a scanning angle Φ of the laser beam. Additionally, in the liquid discharge apparatus 100A of the second embodiment, it is possible to achieve the same types of various operational effects as described in the first embodiment.

C. Third Embodiment

Figure 9:
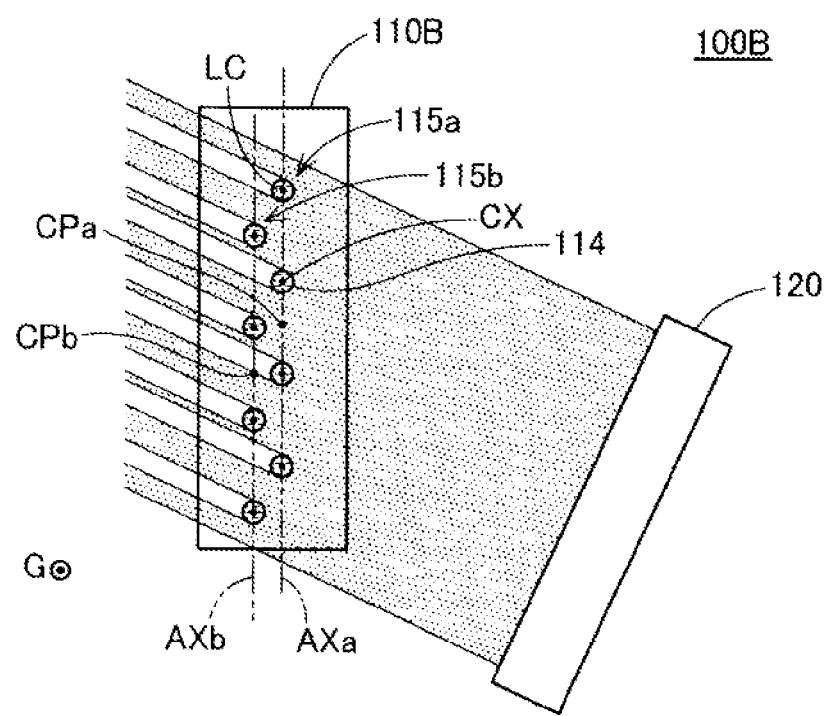
FIG. 9 is a diagram schematically depicting a configuration of a liquid discharge apparatus of a third embodiment.

FIG. 9 is a diagram schematically depicting a configuration of a liquid discharge apparatus 100B of the third embodiment of the invention. Similar to FIG. 5, FIG. 9 schematically illustrates a head unit 110B and the liquid droplet generating unit 120, when the liquid discharge apparatus 100A of the second embodiment is viewed from below in the vertical direction. FIG. 9 illustrates an axial line AXa that represents the arrangement direction of the nozzles 114 in a first nozzle array 115a and an axial line AXb that represents the arrangement direction of the nozzles 114 in the second nozzle array 115b. The liquid discharge apparatus 100B of the third embodiment has substantially the same configuration as the liquid discharge apparatus 100 of the first embodiment, except that the head unit 110B has the two nozzle arrays 115a and 115b.

The first nozzle array 115a and the second nozzle array 115b are provided to be parallel to each other and the arrangement directions of the nozzles 114 of the first nozzle array 115a and the second nozzle array 115b are parallel to each other. The first nozzle array 115a is provided in front in the emitting direction of the laser beam from the liquid droplet generating unit 120 and the second nozzle array 115b is provided in rear. In addition, one of the nozzles 114 included in the second nozzle array 115b is positioned between the nozzles 114 included in the first nozzle array 115a, when viewed in the direction orthogonal to the arrangement direction of the nozzle 114. In other words, in the liquid discharge apparatus 100B of the third embodiment, the plurality of nozzles 114 are arranged to have a zigzag shape in the arrangement direction of the nozzles 114 in the head unit 110. Note that the first nozzle array 115a and the second nozzle array 115b communicate with different liquid chambers (not illustrated), respectively, and discharge different types of liquid materials, respectively.

The liquid droplet generating unit 120 emits the laser beam having the same wide horizontal width as described in the first embodiment, in the direction obliquely intersecting with the arrangement direction of the nozzles 114 when viewed from the center CPa of the first nozzle array 115a or the center CPb of the second nozzle array 115b. The liquid droplet generating unit 120 emits the laser beam from a position at which the nozzles of the two nozzle arrays 115a and 115b do not overlap each other when viewed in the emitting direction of the laser beam.

In the liquid discharge apparatus 100B of the third embodiment, it is possible to further decrease an amount of the light energy that is likely to pass between the liquid columns LC. In addition, the liquid discharge apparatus is more efficiently used because it is possible to irradiate the plurality of liquid columns LC of the liquid material with the same laser beam and to apply the light energy for generating the liquid droplet. Additionally, in the liquid discharge apparatus 100B of the third embodiment, it is possible to achieve the same types of various effects described in the first embodiment.

D. Modification Example

D1. Modification Example 1

The liquid discharge apparatuses 100, 100A, and 100B of the embodiments described above are configured as a 3D printer that discharges a liquid material and forms a three-dimensional object. By comparison, the liquid discharge apparatuses 100, 100A, and 100B of the embodiments described above may be configured, for example, as an ink jet printer that discharges ink and forms an image. In this case, ink droplets are discharged to a printing medium or a recording medium, instead of the forming stage 160. In addition, the energy applying unit 150 may be omitted. In the liquid discharge apparatuses 100, 100A, and 100B of the embodiments described above, the forming stage 160 is the target object on which the liquid material lands. In this respect, the target object, on which the liquid material lands, is not limited to the forming stage 160. The liquid discharge apparatuses 100, 100A, and 100B may discharge the liquid material to a metal plate that is detachably attached on the forming stage 160, to a three-dimensional object obtained by sintering the powder material, or to a three-dimensional object obtained by melting and then solidifying the powder material, as the target object, instead of the forming stage 160.

D2. Modification Example 2

In the liquid discharge apparatuses 100, 100A, and 100B of the embodiments described above, the liquid droplet generating units 120 and 120A irradiate, with the laser beam, the liquid columns LC extending downwardly from all of the nozzles 114 of the nozzle arrays 115, 115a, and 115b. By comparison, the liquid droplet generating units 120 and 120A may irradiate, with the laser beam, only some of the liquid columns LC extending downwardly from the nozzles 114 of the head units 110 and 110B. The liquid droplet generating units 120 and 120A may be configured to be capable of irradiating at least two liquid columns LC of the liquid columns LC extending downwardly from the nozzles 114 of the head units 110 and 110B. Note that, in this case, an example of the nozzle array, that is configured of some nozzles 114 from which the liquid columns LC that are irradiated with the laser beam are generated, corresponding to a subordinate concept of the nozzle array according to the invention. In addition, in the embodiments described above, the nozzles 114, which configure the nozzle arrays 115, 115a, and 115b, are arranged at equal intervals. By comparison, the nozzles 114, which configure the nozzle arrays 115, 115a, and 115b, may be arranged at equal intervals.

D3. Modification Example 3

In the liquid discharge apparatuses 100, 100A, and 100B of the embodiments described above, the plurality of nozzles 114, which configure the nozzle arrays 115, 115a, and 115b, discharge a common liquid material. By comparison, the plurality of nozzles 114, which configure the nozzle arrays 115, 115a, and 115b, may communicate with liquid chambers that store different types of liquid materials, respectively, and may discharge the different types of liquid materials. For example, a configuration, in which, of the plurality of nozzles 114 which configure the nozzle arrays 115, 115a, and 115b, some nozzles 114 discharge a liquid material for forming a three-dimensional object, and the other nozzles 114 discharge a liquid material for forming a support portion that supports the three-dimensional object, may be employed. In addition, all of the nozzles 114, which configure the nozzle arrays 115, 115a, and 115b, may communicate with different liquid chambers, respectively, and may discharge the different types of liquid materials.

D4. Modification Example 4

In the liquid discharge apparatuses 100, 100A, and 100B of the embodiments described above, a timing of the irradiation with the laser beam by the liquid droplet generating units 120 and 120A is adjusted and two types of liquid droplets L1 and L2 having different sizes are generated. By comparison, the liquid discharge apparatuses 100, 100A, and 100B may be configured to continuously generate the liquid droplets having one size. In this case, the control unit 101 may select liquid droplets that have to land on the forming stage 160 from the liquid droplets having one size and may cause the direction changing unit 130 to execute the irradiation with the laser beam, according to the timing at which the liquid droplets are generated. The liquid discharge apparatuses 100, 100A, and 100B may be configured to generate three or more types of liquid droplets having different sizes. In addition, the control unit 101 may adjust, for example, the intensity or the wavelength of the laser beam instead of the timing of the irradiation with the laser beam by the liquid droplet generating units 120 and 120A, in order to generate liquid droplets having different sizes.

D5. Modification Example 5

In the liquid discharge apparatuses 100, 100A, and 100B of the embodiments described above, the direction changing unit 130 applies light energy to the first liquid droplets L1 having the small size and changes the flying direction of the first liquid droplets. By comparison, the direction changing unit 130 may apply light energy to the second liquid droplets L2 having the large size and may change the flying direction of the second liquid droplets. In addition, regardless of the magnitude of the size, the direction changing unit 130 may be configured to change the flying direction of the liquid droplets selected by the control unit 101.

D6. Modification Example 6

In the liquid discharge apparatuses 100, 100A, and 100B of the embodiments described above, the direction changing unit 130 applies light energy to the liquid droplets through the irradiation with the laser beam and changes the flying direction of the liquid droplets. By comparison, the direction changing unit 130 may apply energy other than the light energy to the liquid droplets, thereby changing the flying direction of the liquid droplets. The direction changing unit 130 may apply energy to the liquid droplets by using a maser, thereby changing the flying direction of the liquid droplets. In addition, the direction changing unit 130 may cause a current of air or the like to be produced and apply kinetic energy to the liquid droplets, thereby changing the flying direction of the liquid droplets.

D7. Modification Example 7

In the embodiments described above, the direction changing unit 130 is configured to emit one laser beam with respect to one nozzle 114. By comparison, similar to the liquid droplet generating unit 120 of the first embodiment and the third embodiment, the direction changing unit 130 may be configured to be capable of uniformly irradiating, with the laser beam, the liquid droplets discharged from the nozzles 114. In addition, similar to the liquid droplet generating unit 120A of the second embodiment, the direction changing unit may be configured to selectively irradiate the liquid droplets by scanning with the laser beam with which an irradiation position can be changed. In addition, in the embodiments described above, the condensed positions of the laser beams with which the direction changing unit 130 performs irradiation may not be adjusted with accuracy as long as the flying direction of the liquid droplets can be changed. For example, without focusing the laser beam as a spot on the liquid droplets, the irradiation may be performed with a plane-shaped laser beam along a plane perpendicular to the flying direction of the liquid droplets and the flying direction of the liquid droplets may be changed. In addition, the irradiation may be performed with the laser beam of which a condensed spot has an elliptical shape and the flying direction of the liquid droplets may be changed. The direction changing unit 130 may emit a pulsed laser beam.

D8. Modification Example 8

In the liquid discharge apparatuses 100, 100A, and 100B of the embodiments described above, the liquid droplets of which the flying direction is changed by the direction changing unit 130 land on the forming stage 160, and the liquid droplets of which the flying direction is not changed by the direction changing unit 130 are collected in the collecting unit 140. By comparison, the liquid droplets of which the flying direction is not changed by the direction changing unit 130 may land on the forming stage 160, and the liquid droplet of which the flying direction is changed by the direction changing unit 130 may be collected in the collecting unit 140.

D9. Modification Example 9

In a configuration of the modification example 3 described above, the receptacle 141 of the collecting unit 140 may be configured to move in the horizontal direction by an actuator that includes a shaft or a motor, for example, under control of the control unit 101. In this case, the control unit 101 may cause the receptacle 141 of the collecting unit 140 to move vertically below the nozzles 114 until the direction changing unit 130 starts irradiation with the laser beam, and may cause the receptacle to move away from the region vertically below the nozzles 114 while the direction changing unit 130 performs the irradiation with the laser beam. As described above, when the receptacle 141 of the collecting unit 140 is configured to be movable, it is possible to reduce waste of the liquid droplets which uselessly land on the forming stage 160.

D10. Modification Example 10

In the liquid discharge apparatuses 100, 100A, and 100B of the embodiments described above, the collecting unit 140 collects at least some of the liquid droplets generated by the liquid droplet generating unit 120, and the collected liquid is resupplied to the head units 110 and 110B. By comparison, the liquid material collected in the collecting unit 140 may not be resupplied to the head units 110 and 110B or, for example, may be discarded as it is. Otherwise, in the liquid discharge apparatuses 100, 100A, and 100B of the embodiments described above, the collecting unit 140 may be omitted.

D11. Modification Example 11

In the liquid discharge apparatuses 100, 100A, and 100B of the embodiments described above, the liquid supply unit 105 may be configured to supply a high-pressure liquid material to the head unit 110 and it is possible to arbitrarily change the configuration thereof.

D12. Modification Example 12

In the liquid discharge apparatuses 100, 100A, and 100B of the embodiments described above, the energy applying unit 150 sinters or solidifies the liquid droplets whenever the liquid droplets land. By comparison, the energy applying unit 150 may apply energy, sinter, or solidify the liquid droplets by overheating the liquid droplets in a heating furnace or the like after molding is completed with a liquid material having a high viscosity to the extent that a shape is maintained after landing. In addition, the source of the energy applied by the energy applying unit 150 is not limited to the laser beam, and, for example, a heater may apply thermal energy, or may apply light energy such as ultraviolet light, or electromagnetic energy such as a microwave, depending on the characteristics of the liquid.

D13. Modification Example 13

In the embodiments described above, some or all of functions and processes executed by software may be executed by hardware. In addition, some or all of functions and processes executed by hardware may be executed by software. It is possible to use, as hardware, various types of circuits such as an integrated circuit, a discrete circuit, or a circuit module in which the circuits are combined.

The invention is not limited to the embodiments, examples, or modification examples described above, and it is possible to implement the invention with various configurations within a range without departing from a gist thereof. For example, it is possible to appropriately replace or combine technical features described in the embodiments, examples, and modification examples, which correspond to technical features in the aspects described in Summary, in order to achieve some or all of the objects described above or in order to achieve some or all of the effects described above. In addition, if the technical features are not described as essential in the specification, it is possible to appropriately remove the technical features.

The entire disclosure of Japanese patent No. 2015-255789, filed Dec. 28, 2015 is expressly incorporated by reference herein.

What is claimed is:

1. A liquid discharge apparatus comprising:
a head unit that has a nozzle array in which a plurality of nozzles are arranged in a predetermined arrangement direction, that discharges a liquid from the plurality of nozzles, and that causes at least two liquid columns to extend downwardly;
a liquid droplet generating unit that irradiates the at least two liquid columns with a laser beam in a direction obliquely intersecting with the arrangement direction when viewed from a center of the nozzle array and that separates liquid droplets from the liquid column, wherein the laser beam has a condensed shape of which a horizontal width in a horizontal direction is wider than a vertical width in a vertical direction and the irradiation is performed over the at least two liquid columns; and
a direction changing unit that applies energy to the liquid droplets and changes flying directions of the liquid droplets.

2. The liquid discharge apparatus according to claim 1, wherein, when the number of nozzles included in the nozzle array is N, an interval between the adjacent nozzles in the arrangement direction is D, the horizontal width of the laser beam is Lw, and a small angle of angles between a direction orthogonal to the arrangement direction and an emitting direction of the laser beam is θ, a relationship of Lw>D·(N−1)·cos θ is satisfied.

3. The liquid discharge apparatus according to claim 1, wherein the head unit has a liquid chamber that communicates with each of the plurality of nozzles and stores a liquid.

4. The liquid discharge apparatus according to claim 1, wherein the direction changing unit applies the energy to the liquid droplets through irradiation with the laser beam.

5. The liquid discharge apparatus according to claim 1, wherein the liquid droplet generating unit generates liquid droplets having a first size and liquid droplets having a second size that is larger than the first size.

6. The liquid discharge apparatus according to claim 5, further comprising:
a collecting unit that collects the liquid droplets having the first size or the liquid droplets having the second size and resupplies the collected liquid to the head unit.

7. The liquid discharge apparatus according to claim 6, wherein the direction changing unit changes a flying direction of the liquid droplets having the first size, but does not change a flying direction of the liquid droplets having the second size, and
wherein the collecting unit collects the liquid droplets having the first size, of which the flying direction is changed, but does not collect the liquid droplets having the second size, of which the flying direction is not changed.

8. The liquid discharge apparatus according to claim 6, wherein the direction changing unit changes the flying direction of the liquid droplets having the first size, but does not change the flying direction of the liquid droplets having the second size, and
wherein the collecting unit does not collect the liquid droplets having the first size, of which the flying direction is changed, but collects the liquid droplets having the second size, of which the flying direction is not changed.

9. The liquid discharge apparatus according to claim 1, further comprising:
an energy applying unit that applies energy to the liquid droplets having landed on a predetermined target object.

10. The liquid discharge apparatus according to claim 9, wherein the liquid is a flowable composition that contains powder and a solvent, and
wherein the energy applying unit applies energy to the liquid droplets having landed, thereby sintering the powder in the liquid droplets or melting the powder in the liquid droplets and then solidifying the powder.

11. The liquid discharge apparatus comprising:
a head unit that has a nozzle array in which a plurality of nozzles are arranged in a predetermined arrangement direction, that discharges a liquid from the plurality of nozzles, and that causes at least two liquid columns to extend downwardly;
a liquid droplet generating unit that irradiates the at least two liquid columns with a laser beam in a direction obliquely intersecting with the arrangement direction when viewed from a center of the nozzle array and that separates liquid droplets from the liquid column, wherein the liquid droplet generating unit performs scanning with the laser beam in a direction parallel to the arrangement direction, and irradiates the at least two liquid columns with the laser beam; and
a direction changing unit that applies energy to the liquid droplets and changes flying directions of the liquid droplets.

12. A method for discharging a liquid comprising:
discharging a liquid from each of a plurality of nozzles in a nozzle array in which the plurality of nozzles are arranged in a predetermined arrangement direction and causing a liquid column to extend downwardly;

irradiating at least two liquid columns with a laser beam in a direction obliquely intersecting with the arrangement direction when viewed from a center of the nozzle array and separating liquid droplets from the liquid column, wherein the laser beam has a condensed shape of which a horizontal width in a horizontal direction is wider than a vertical width in a vertical direction and the irradiation is performed over the at least two liquid columns, wherein; and applying energy to the liquid droplets and changing flying directions of the liquid droplets.

13. The method for discharging a liquid according to claim 12, further comprising:

applying energy to the liquid droplets having landed on a predetermined target object.

14. The method for discharging a liquid according to claim 13, wherein the liquid is a flowable composition that contains powder and a solvent, and wherein the applying of the energy to the landing liquid droplets includes: applying the energy to the landing liquid droplets; and sintering the powder in the liquid droplet or melting the powder in the liquid droplet and then solidifying the powder.

15. A method for discharging a liquid comprising:

discharging a liquid from each of a plurality of nozzles in a nozzle array in which the plurality of nozzles are arranged in a predetermined arrangement direction and causing a liquid column to extend downwardly;

irradiating at least two liquid columns with a laser beam in a direction obliquely intersecting with the arrangement direction when viewed from a center of the nozzle array and separating liquid droplets from the liquid column, wherein the liquid droplet generating unit performs scanning with the laser beam in a direction parallel to the arrangement direction, and irradiates the at least two liquid columns with the laser beam; and applying energy to the liquid droplets and changing flying directions of the liquid droplets.

\* \* \* \* \*